Patented Apr. 5, 1938

2,112,961

UNITED STATES PATENT OFFICE 2,112,961

DERIVATIVES OF PARA-PHENANTHROLIN AND MANUFACTURE THEREOF

Hans Henecka, Wuppertal-Elberfeld, Germany, assignor to Winthrop Chemical Company, Inc., New York, N. Y., a corporation of New York No Drawing. Application June 25, 1937, Serial No. 150,332. In Germany July 8, 1936

9 Claims. (Cl. 260—40)

This invention relates to a process for the manufacture of derivatives of para-phenanthrolin and to the products obtainable by such process.

In accordance with the present invention new derivatives of para-phenanthrolin are obtained by reacting upon 4.4'-dihalogen-para-phenanthrolin (the halogen standing in para-position to the ring nitrogen atom) with thiourea or selenium urea. Instead of thiourea or selenium urea also hydrogen sulfide or hydrogen selenide may be brought to reaction in the presence of acid binding agents or hydro-sulfuric or hydroselenic acid salts, for instance, alkali or alkaline-earth metal salts. The reaction proceeds preferably while heating in the presence of solvents or diluents which are inert to the starting materials, for instance water or alcohols. Thereby with the splitting off of the two halogen atoms the 4- and 4'-position of the para-phenanthrolin are connected by sulfur or selenium with ring formation, for instance, when using thiourea according to the following formula:

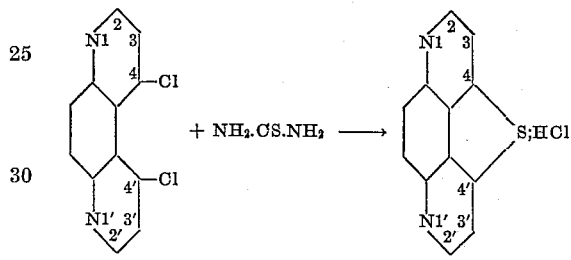

From the salts of the 4.4'-thio- or seleno-para-phenanthrolin the free base is readily obtained in the usual manner.

The new phenanthrolin derivatives thus obtained are to be employed as initial materials in chemical processes. They are distinguished also by an anodyne action.

The invention is further illustrated by the following examples without being restricted thereto:

*Example 1.*—10 grams of 2.2'-dimethyl-4.4'-dichloro-phenanthrolin are heated to boiling with 2.8 grams of thiourea and 45 ccs. of alcohol. After boiling for about 20 minutes temporary partial solution takes place with a light-yellow coloration of the liquid, whereupon a large quantity of a light yellow substance separates with solidification of the reaction mixture and vigorous boiling of the alcohol. The mixture is heated to boiling for another hour, whereupon the mixture becomes thinly liquid. After cooling it is filtered with suction, the salt obtained dissolved in hot water and the hot solution rendered alkaline by the addition of potassium carbonate solution. A white, crystalline precipitate separates which is filtered with suction, washed and recrystallized from alcohol. The 2.2'-dimethyl-4.4'-trio-para-phenanthrolin obtained in this manner is a white, crystalline mass which melts at 229–231° C.

The said compound is also obtained when using an excess of thiourea.

When using instead of thiourea the corresponding quantity of selenium urea the 2.2'-dimethyl-4.4'-seleno-para-phenanthrolin is obtained. It is a leafy-crystalline substance which melts at 232° C.

When reacting upon 4.4'-dichloro-para-phenanthrolin, melting at 233° C. with thiourea in the manner described above the 4.4'-thio-para-phenanthrolin melting at 186–187° C. is obtained.

*Example 2.*—10 grams of 2.2'-dimethyl-4.4'-dichloro-para-phenanthrolin are heated to boiling with 5.6 grams of thiourea in 100 ccs. of water. After boiling for about 5 to 6 hours solution takes place. On treating the hot solution with potassium carbonate until the reaction is alkaline the 2.2'-dimethyl-4.4'-thio-para-phenanthrolin described in Example 1 is obtained.

*Example 3.*—13 ccs. of a sodium hydrosulfide solution which contains 21.2 grams of bound hydrogen sulfide in 100 ccs. are gradually added drop by drop to a boiling solution of 10 grams of 2.2'-dimethyl-4.4'-dichloro-para-phenanthrolin in 150 ccs. of alcohol. It is heated to boiling for 2 to 3 hours until the evolution of hydrogen sulfide has ceased. After cooling the coarse, prism-like crystals are filtered off, washed with water and recrystallized from alcohol. In this manner the 2.2'-dimethyl-4.4'-thio-para-phenanthrolin melting at 231° C. is obtained.

The same product is obtained when using instead of the sodium hydrosulfide a solution of calcium hydrosulfide in an equivalent quantity.

The reaction can also be carried out by introducing hydrogen sulfide into the boiling solution of 10 grams of 2.2'-dimethyl-4.4'-dichloro-para-phenanthrolin until it is saturated, then, with continuous passing through of hydrogen sulfide, adding a solution of 3 grams of sodium hydroxide or a suspension of the equivalent quantity of calcium hydroxide in 15 ccs. of water drop by drop, heating the mixture to boiling for 2 to 3 hours and separating the reaction product in the manner described above.

When using instead of hydrogen sulfide hydrogen selenide and carrying out the process as described above the 2.2'-dimethyl-4.4'-selenopara-phenanthrolin melting at 232° C. is obtained.

I claim:—

1. The process which comprises reacting upon 4.4'-dihalogen-para-phenanthrolin with a compound selected from the group consisting of thio-urea and seleno-urea in the presence of a diluent which is inert to the starting materials, while heating.

2. The process which comprises reacting upon 4.4'-dichloro-para-phenanthrolin with a compound selected from the group consisting of thio-urea and seleno-urea in the presence of a diluent which is inert to the starting materials, while heating.

3. The process which comprises reacting upon 2.2'-dimethyl-4.4'-dichloro-para-phenanthrolin with thiourea in the presence of a diluent which is inert to the starting materials, while heating.

4. The process which comprises reacting upon 2.2'-dimethyl-4.4'-dichloro-para-phenanthrolin with seleno-urea in the presence of a diluent which is inert to the starting materials, while heating.

5. A para-phenanthrolin derivative in which the carbon atoms in the 4- and 4'-positions are connected with one another by an atom selected from the group consisting of sulfur and selenium.

6. A 4.4'-thio-para-phenanthrolin.

7. 2.2'-dimethyl-4.4'-thio-para-phenanthrolin.

8. A 4.4'-seleno-para-phenanthrolin.

9. 2.2'-dimethyl-4.4'-seleno-para-phenanthrolin.

HANS HENECKA.